UNITED STATES PATENT OFFICE.

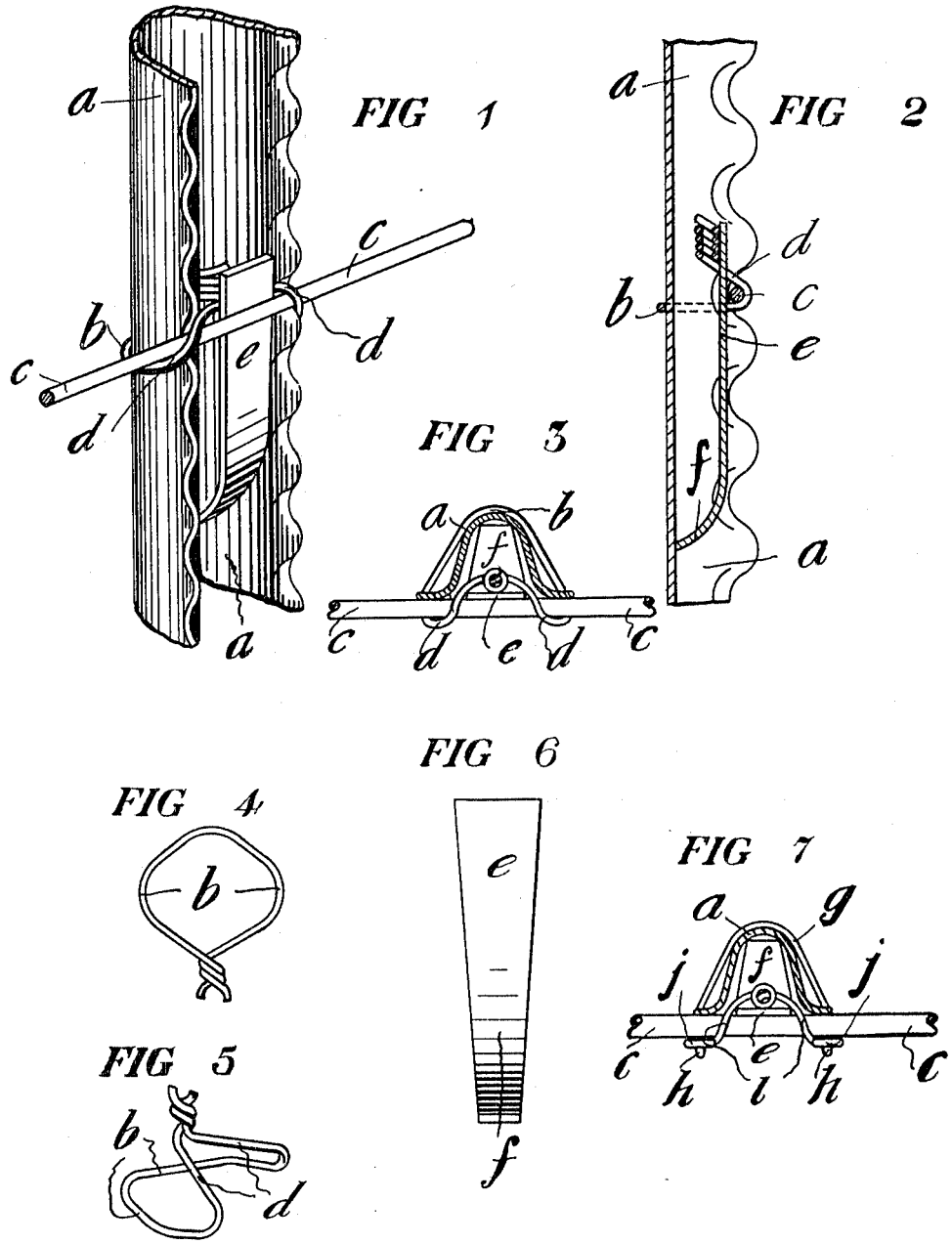

DUDLEY DE ROS, OF ISLINGTON, LONDON, ENGLAND.

MEANS OF SECURING WIRE TO STANDARDS.

1,102,394. Specification of Letters Patent. Patented July 7, 1914.

Application filed September 19, 1913. Serial No. 790,743.

*To all whom it may concern:*

Be it known that I, DUDLEY DE ROS, a citizen of the United Kingdom, residing at 31 Gerrard street, Islington, in the county of London, England, engineer, have invented certain new and useful Improvements in or Relating to the Means of Securing Wires to Standards, of which the following is a specification.

This invention comprises improvements in or relating to that means of securing wires or the like to droppers or standards employed in wire fencing, in which a clip of wire or metal is employed in conjunction with a wedge member adapted to be so inserted with relation to the clip, wire and dropper as to be capable of firmly securing the wire to the dropper when said wedge member is operated and has for its object to provide such a sure connection of the wires and droppers that the latter cannot be accidentally displaced and hang at various angles with respect to the wires but always retain the position in which they are placed, i. e. usually an upright position at right angles to the fence wires.

The invention consists in the provision of a clip of a distinctive construction by means of which a more efficient and stable connection of the wire to the dropper may be obtained than has heretofore been the case with other kinds of shapes of clips.

Furthermore this invention contemplates a wedge member of an improved type which will be more fully described hereinafter.

According to the present invention the clip, which is adapted to embrace the dropper as in general practice is bent or turned by any suitable means and for a portion of its length or periphery, over and around the wire to be supported so as to partially embrace same, and a wedge shaped member is then inserted and driven between said wire and the turned over portion of the clip in such a manner that the whole—that is to say, both the turned over portion of the clip and the wedge shaped member, lies within the hollow or groove of the dropper.

In order that my invention may be readily understood and carried into practical effect I have appended hereunto a sheet of explanatory drawings.

On these drawings: Figure 1 is a perspective view of a dropper with my invention applied for securing the wires thereto, a portion of the dropper and one wire only being shown. Fig. 2 is a longitudinal section. Fig. 3 is a transverse section. Figs. 4 and 5 are detail views showing a preferred form of clip employed. Fig. 6 is an elevation of a suitable member for inserting between the clip and the wire to lock the same in place. Fig. 7 is a cross sectional view of a dropper with a modified form of clip shown thereon.

Around a suitable dropper or standard $a$ I provide a clip $b$ consisting of a band or wire loop, preferably made endless ready for use, and this clip is placed around the dropper $a$ or standard and moves upwardly or downwardly along the dropper until it comes into contact with one side of one of the wires $c$ of the fence, which in the example shown will rest in one of the dents or recesses of the dropper. In the example shown the dropper or standard has corrugated edges for the reception of the wires in the recesses but my invention may be used in combination with any dropper or standard to which it is applicable, whether it contains holes, projections on flanged sides, or is of any other section or kind. The part of the clip $b$ adjacent to the open side or front of the dropper is then turned or bent over the wire as at $d$, preferably by means of a rod or a nail that is inserted between the clip $b$ and wire $c$ and turned using the wire as a fulcrum; the clip is by this means bent toward the rear and within the section of the dropper. A wedge or other fastening member $e$ is then inserted between the turned over portion $d$ of the clip $b$ and the wire $c$ and is gently driven home so that the wedge portion serves to draw the clip very tightly around the dropper or standard $a$.

I prefer to employ a clip $b$ formed of suitable wire, the ends of which are twisted around each other to form an endless band, though any kind of an endless band may be employed. In cases where a clip formed of wire with twisted ends is employed the twisted ends of the clip are preferably placed adjacent to the front or open side of the dropper and then bent around the wire of the fence into the interior of the dropper so that these twisted ends are protected by the sides of the dropper $a$.

It is obvious that modifications may be effected in the clip such as in Fig. 7, which will be hereafter-described, but it is to be understood that all modifications wherein the wedge or other member is inserted between the fence wire and the clip and within the section of the dropper come within the meaning of this invention.

In Fig. 7 the clip is in two parts, a rear part $g$ passing around the dropper and provided with loops or equivalent means $h$ and a front part $i$, provided with hooks $j$ or like means to engage the means $h$ and draw the part $g$ tightly around the dropper when the part $i$ is forced back and held by the wedge or other fastening member.

The fastening member $e$ I prefer to employ is of wedge shape, and preferably but not necessarily, has its tapered end $f$ bent and suitably shaped so that it is adapted to bear against the back of the interior of the dropper $a$.

It will be observed that by means of my invention the wires $c$ are securely fastened to the dropper $a$ without the securing means presenting any projecting portions, as the parts of the fastening are disposed within the section of the dropper in this arrangement. Animals cannot therefore scratch or tear themselves against the fastening and at the same time the fastening is rendered more secure as its displaceable parts are protected by the section of the dropper.

What I then claim is—

1. The combination with a horizontal wire to be supported, of a standard of substantially U-shaped cross section and having notched edges, said horizontal wire being disposed in certain of the notches of the dropper, a wire clip surrounding the dropper and embracing the horizontal wire, and a plate interposed between said horizontal wire and said clip, said plate lying substantially within the groove of the dropper.

2. The combination with a horizontal wire to be supported, of a standard of substantially U-shaped cross section and having notched edges, said horizontal wire being disposed in certain of the notches of the dropper, a wire clip surrounding the dropper and embracing the horizontal wire, and a plate interposed between said horizontal wire and said clip, said plate lying substantially within the groove of the dropper, said plate having a wedge-like outline in elevation and having its smaller end bent so as to contact with the inner face of the dropper.

In testimony whereof I affix my signature in presence of two witnesses.

DUDLEY DE ROS.

Witnesses:
H. A. WESTMORELAND,
WM. TILLIETTA HART.

---

Copies of this patent may be obtained for five cents each, by addressing the "Commissioner of Patents, Washington, D. C."